(12) United States Patent
Enders et al.

(10) Patent No.: US 7,860,496 B2
(45) Date of Patent: Dec. 28, 2010

(54) DEVICE AND METHOD FOR SIMULATING A DATA TRANSMISSION VIA A DATA TRANSMISSION NETWORK

(75) Inventors: Thorsten Enders, Illingen (DE);
Juergen Schirmer, Heidelberg (DE);
Frank Stiegler, Ludwigsburg (DE);
Klaus Dostert, Krickenbach (DE)

(73) Assignee: Robert Bosch GmbH, Stuttgart (DE)

( * ) Notice: Subject to any disclaimer, the term of this patent is extended or adjusted under 35 U.S.C. 154(b) by 1065 days.

(21) Appl. No.: 10/877,254

(22) Filed: Jun. 24, 2004

(65) Prior Publication Data

US 2005/0083889 A1    Apr. 21, 2005

(30) Foreign Application Priority Data

Jun. 27, 2003   (DE) ................. 103 28 958
Nov. 24, 2003   (DE) ................. 103 54 876

(51) Int. Cl.
*H04W 24/00* (2009.01)
(52) U.S. Cl. ............. 455/423; 455/424; 455/67.11; 455/67.13; 455/402; 703/21; 703/22; 307/10.1
(58) Field of Classification Search ............. 455/402, 455/423, 67.11, 67.13, 446, 424; 703/21, 703/22; 307/10.1
See application file for complete search history.

(56) References Cited

U.S. PATENT DOCUMENTS 4,528,656 A * 7/1985 Morais .................. 370/281
5,596,287 A * 1/1997 Cho ......................... 326/40

(Continued)

FOREIGN PATENT DOCUMENTS

DE          103 01 525       7/2004

(Continued)

OTHER PUBLICATIONS

"Analysis of Modulation Methods for Data Communications over the Low-voltage Grid" by Petra Cuncie, 7th International Conference on Telecommunications—Contel 2003; ISBN 953-184-052-0; Jun. 11-13, 2003 Zagreb, Croatia.*

(Continued)

*Primary Examiner*—Vincent P Harper
*Assistant Examiner*—Dung Lam
(74) *Attorney, Agent, or Firm*—Kenyon & Kenyon LLP

(57) ABSTRACT

A device for simulating a data transmission via a data transmission network, especially in a motor vehicle, for evaluating the transmission quality via the network as a function of an interference environment and of a channel characteristic of the network. To be able to draw a conclusion regarding transmission quality that is as reliable and as close to reality as possible, the device receives at least one modulated input signal to be transmitted via the network, that it receives a description of a simulated interference environment, that it receives a description of a simulated channel characteristics of the network, and that it features a logic module which is programmed in such a way that an output signal is computed according to a specifiable algorithm as a function of the received signal and taking into consideration the description of the interference environment and the description of the channel characteristic, the output signal allowing for a conclusion regarding the quality of transmission via the network.

17 Claims, 5 Drawing Sheets

U.S. PATENT DOCUMENTS

| | | | | |
|---|---|---|---|---|
| 5,794,128 | A | * | 8/1998 | Brockel et al. ............ 455/67.11 |
| 5,903,477 | A | * | 5/1999 | Otsu et al. ...................... 703/5 |
| 6,282,678 | B1 | * | 8/2001 | Snay et al. .................. 714/712 |
| 7,188,057 | B2 | * | 3/2007 | Birkelbach et al. ............. 703/7 |
| 2003/0057771 | A1 | * | 3/2003 | Enders et al. ................ 307/9.1 |
| 2004/0232770 | A1 | * | 11/2004 | Gisy et al. ................. 307/10.1 |

FOREIGN PATENT DOCUMENTS

| | | |
|---|---|---|
| DE | 103 04 604 | 8/2004 |

OTHER PUBLICATIONS

DIN VDE 40839, Part 1, 1992.

International Electrotechnical Commission, Radio distrubance characteristics for the protection of recievers used on board vehicles, boats, and on devices—Limits and methods of measurement, International Special Committee on Radio Interference, publication 25, Geneva, 1995.—(Table of Contents, Foreword, Introduction and Scope) pp. 3, 5, 7, 9, 11 and 13.

\* cited by examiner

DEVICE AND METHOD FOR SIMULATING A DATA TRANSMISSION VIA A DATA TRANSMISSION NETWORK

FIELD OF THE INVENTION

The present invention relates to a device for simulating a data transmission via a data transmission network, especially in a motor vehicle, for evaluating the transmission quality via the network as a function of an interference environment and of a channel characteristic of the network. In addition, the present invention relates to a method for simulating a data transmission via a data transmission network, especially in a motor vehicle, for evaluating the transmission quality via the network as a function of an interference environment and of a channel characteristics of the network. Finally, the present invention also relates to a computer program that is executable on a computer, in particular on a microprocessor.

BACKGROUND INFORMATION

The simulation of a data transmission via a network is used, for example, to test the suitability of a specific network topology for the transmission of data in specific environments. In addition, the simulated data transmission may be used to optimize transmission parameters for a transmission of data via a specific network topology. Furthermore, when a new participant is added to a network, it is possible to test whether, as a function of given channel characteristics and a specific interference environment, a data transmission of a sufficiently high transmission quality is possible between the new participant and other participants of the network, and the transmission parameters may be optimized in such a way that a sufficiently high transmission quality in the data transmission can be achieved. All of this may be done using a physically nonexistent, simulated network.

In the automobile industry, the simulation of events in the data transmission network of a motor vehicle, in this case in the so-called vehicle electrical system, is currently only performed using a special simulation of the vehicle electrical system, as represented, for example, in the CISPR (International Special Committee on Radio Interference) publication 25, Geneva, 1995. The transient response characteristic of the network is supposed to be simulated using this special simulation of the vehicle electrical system. The transient response characteristic is a function of, among other things, the channel characteristic of the network. The concept of a channel characteristic is understood in terms of the reflection characteristic, the impedance and the damping of the network. The above-mentioned special simulation of the vehicle electrical system may, however, prove to be unsuitable in many areas and for many applications, and frequently only unrealistic information may be obtained regarding the suitability of a network for the transmission of data.

In addition, for testing purposes so-called ISO pulses may be applied to network components in a motor vehicle in accordance with DIN VDE 40839, Part 1, 1992. To this end, special cases (e.g. overvoltage or undervoltage) are represented in the motor vehicle and observations are conducted to see how the network components react. However, this merely concerns a testing of the RC circuit of the network. This method, however, is not believed to be suitable for simulating a data transmission via a data transmission network.

SUMMARY OF THE INVENTION

The exemplary embodiment and/or exemplary method of the present invention is based on the task of developing and refining a device for simulating a transmission of data via a data transmission network in such a way that a network, or a method for transmitting data via the network, may be optimized without requiring that the participants in the network and the network itself are physically implemented and that an actual testing environment is set up during the simulation of the data transmission, while nevertheless ensuring that the results of the simulation are as close to reality and as reliable as possible.

According to the exemplary embodiment and/or exemplary method of the present invention, this task is solved in a simulation device of the mentioned type in that the device includes:

an apparatus, arrangement or structure for receiving at least one modulated input signal to be transmitted via the network, an apparatus, arrangement or structure for receiving a description of a simulated interference environment, an apparatus, arrangement or structure for receiving a description of a simulated channel characteristic of the network, and an apparatus, arrangement or structure for computing a modulated output signal according to a specifiable algorithm as a function of the received signal and taking into consideration the description of the interference environment and the description of the channel characteristic, the output signal allowing for a conclusion regarding the quality of transmission via the network and an apparatus, arrangement or structure for computing the output signal including at least one logic module on which the algorithm is programmed.

Thus the exemplary embodiment and/or exemplary method of the present invention proposes to simulate the transient response characteristic as well as in particular line-conducted interferences of the network. In the laboratory, therefore, the concrete channel characteristics of a particular actually existing data transmission network are simulated on the one hand, while on the other hand an interference environment is simulated. If the transient response characteristic and the interference environment are known, then, using programmed or programmable logic modules, a simulation that largely corresponds to the actual conditions may be generated. The exemplary simulation device according to the present invention represents a hardware-implemented stand-alone approach.

There are data transmission networks, for example, whose channel characteristics are largely known and are mathematically very well described. The characteristics of conventional networks, but also those of conditioned networks, may be measured. In the case of conditioned networks, special—which may be mathematically readily describable—network characteristics are generated by special measures such as, for example, twisted double lines, ferrite beads etc. The captured transient response characteristics of these networks can then be simulated using programmable logic modules.

For simulating the interference environment, methods for synthesizing line-conducted pulse interferences and for simulating an interference environment in a motor vehicle electrical system have been specified in the applicant's non-prepublished German patent application document nos. 103 01 525 and 103 04 604, for example for a supply line structure that is also used for data transmission (so-called powerline communications, PLC). In this context, statistic considerations and approaches play a role in the simulation of a concrete interference environment. The point here is not to try to reproduce the actual interferences as precisely as possible in the simulated interferences. Rather, the simulated interferences are generated using statistical characteristics of the actual interferences. This allows for a simulation of the interference environment that is particularly close to reality and reliable. In particular, findings obtained in this manner or the knowledge of the interference environment, particularly the dependence on driving conditions such as in particular city driving, expressway driving or country road driving, or speed range, may be represented by programmed or programmable logic modules. Regarding approaches for simulating the interference environment, explicit reference is made to the German patent application document nos. 103 01 525 and 103 04 604, which are incorporated by reference.

An advantage that may be achieved by the exemplary embodiment and/or exemplary method of the present invention is the possibility of being able to test in the laboratory newly conceived components as possible participants of the vehicle's data transmission network for their suitability, namely, regarding their influence on other components and regarding their susceptibility to be influenced by other components. In this manner the quality of the data transmission may be ascertained by comparing an input (transmitted) and an output (received) signal. The input and output of such a signal occurs in terms of hardware.

In the simulation device according to the present invention either baseband or modulated signals may be considered. The modulated signals may be generated from the baseband signals on the input side of the simulation device using a modulator. Conversely, on the output side of the device, the modulated signals may be converted into baseband signals by a demodulator. The functions of a modulator and of a demodulator may be combined in a so-called transceiver (modem).

According to an exemplary embodiment of the present invention, logic modules, particularly FPGAs (field programmable gate arrays) and/or DSPs (digital signal processors) are used for the concrete simulation of the channel characteristic of the data transmission network and of line-conducted interferences. The simulated channel characteristic and the simulated interference environment may be stored as parameter records in the logic modules. The parameter records may be stored using simple flash programming of the logic modules.

For the implementation of an interference scenario, i.e. for the simulation of a concrete interference environment, particularly the so-called binary model or the frequency model may be used, namely as a function of the performance of the available modules. In the case of the binary model, interference pulses occurring in the electrical system of a vehicle are characterized solely by their maximum amplitude A, their duration B and their interval D. They can therefore be approximated by square waves. This can be represented in a relatively simple manner with the aid of programmable logic modules. If, for example, only a frequency range below 50 MHz is considered, this representation will be an approximation, sufficiently precise for the purposes concerned, of the interference scenario in the time-frequency plane. Here the interference scenario may be computed by a DSP.

In the case of the simulation of interference pulses using the frequency model, the aim is to represent the pulse in its precise pattern. The characteristic of the pulse is also preserved in the time-frequency plane, allowing for conclusions across the entire frequency range. Although this representation proves to be very computation-intensive, it provides simulation results that are very close to reality and reliable. More detailed information regarding the use of a frequency model for simulating a concrete interference environment can also be found in German patent application document no. 103 01 525. In this regard, explicit reference is made to this patent application.

The modeling of the channel characteristic may be achieved, for example, by connecting multiple filter structures in series. FIR (finite impulse response) filters and IIR (infinite impulse response) filters are available for this purpose. Such filter structures can be implemented in an FPGA.

DETAILED DESCRIPTION

Figure 1:
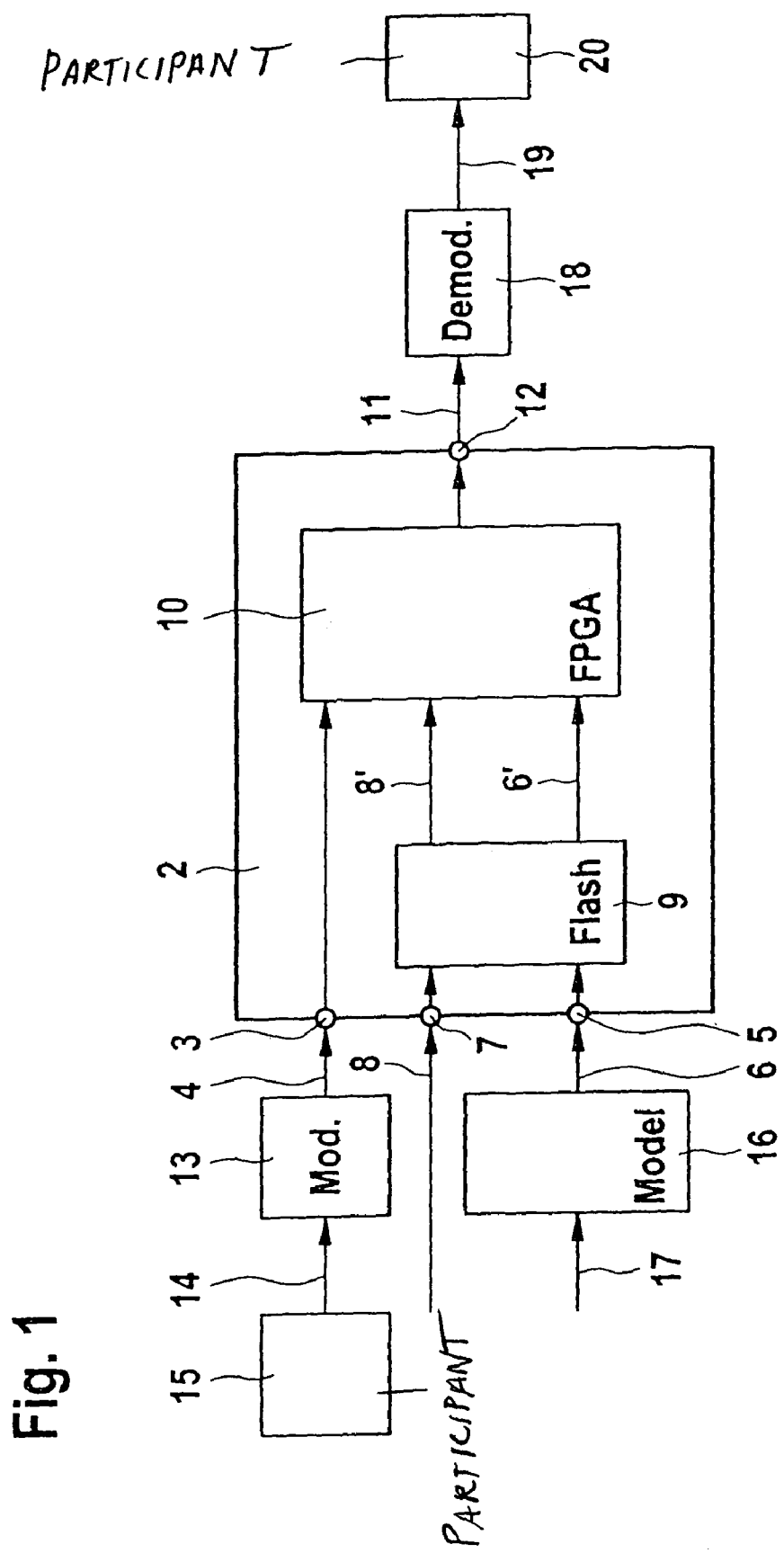
FIG. 1 shows a schematic representation of the principal structure of a simulation device of the present invention according to a first exemplary embodiment.

FIG. 1 shows the principal structure of a device 2 for simulating a data transmission via a data transmission network. The network may be arranged as a supply line structure that can also be used for transmitting data (so-called power line communications, PLC). Networks of this type may be used for transmitting data in vehicles, particularly in motor vehicles. With the aid of simulation device 2, the transmission quality via the network may be evaluated as a function of an interference environment and of a channel characteristic of the network without requiring that the network and the interference environment actually exist.

Simulation device 2 includes an input 3 for receiving at least one modulated input signal 4 to be transmitted via the network. In addition, device 2 includes an input 5 for receiving a description 6 of a simulated interference environment, for example, in the form of a parameter record. Furthermore, device 2 includes an input 7 for receiving a description 8 of a simulated channel characteristic of the network, which description may likewise be designed as a set of parameters. Description 6 of the simulated interference environment or the corresponding parameter record and description 8 of the channel characteristic or the corresponding parameter record may be generated in advance of the simulation of the data transmission and may be stored in a memory element 9. Memory element 9 takes the form of a flash memory for example, in which the parameter records are flash-programmed.

Moreover, simulation device 2 includes a programmable or programmed logic module 10, which is takes the form of an FPGA (field programmable gate array) for example. Logic module 10 is programmed in such a way that it computes a modulated output signal 11 according to a specifiable algorithm as a function of received signal 4 and taking into consideration description 6 of the interference environment and description 8 of the channel characteristic. Output signal 11 allows for a conclusion regarding the quality of transmission via the network. Output signal 11 is available at an output 12 of device 2.

In the present exemplary embodiment, descriptions 6 and 8 of the interference environment and of the channel characteristic are not available directly at logic module 10. Rather, logic module 10 accesses data 6' and 8', which are obtained from the parameter records stored in memory element 9. Data 6' and 8' may be identical to descriptions 6 and 8 of the interference environment and of the channel characteristic, or they may deviate from the these. In any case, data 6' and 8' are a function of the descriptions 6 and 8 and permit a conclusion regarding the simulated interference environment and regarding the channel characteristic of the simulated network.

Modulated input signal 4 is generated from a base signal 14 using a modulator 13. Base signal 14 originates from a participant 15 who can be connected to the simulated network. Participant 15 is either an actually existing participant who is physically connected to simulation device 2 or a simulated participant (for example in the form of a signal generator or a transceiver). In place of modulator 13 and participant 15, a signal generator (or a transceiver) may also be provided for generating modulated input signal 4.

The parameter record for description 6 of the interference environment may be generated from measured interference pulses 17 using a model 16. For simulating the interference environment, methods for synthesizing line-conducted pulse interferences and for simulating an interference environment in a motor vehicle electrical system have been specified for example from the applicant's non-prepublished German patent applications, i.e. DE 103 01 525 and DE 103 04 604. Explicit reference is made to these documents concerning the simulation of the interference environment.

Figure 2:
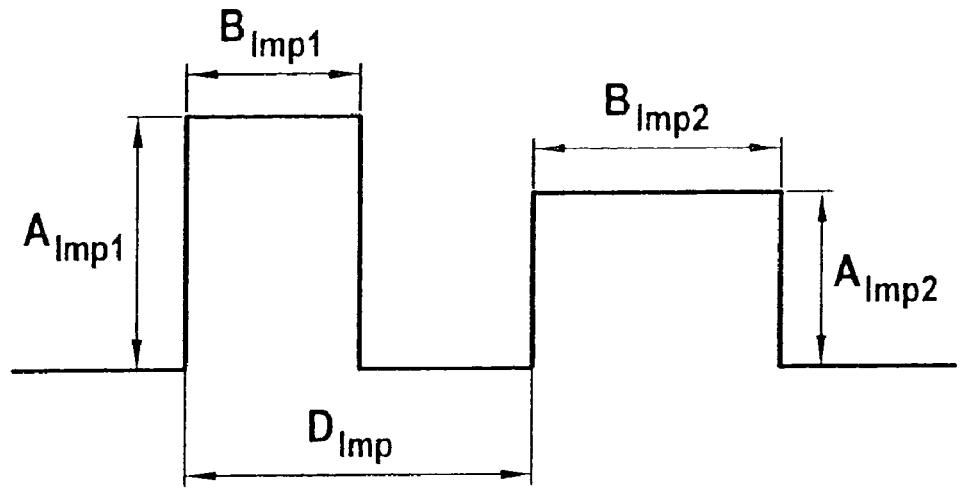
FIG. 2 shows the representation of two interference pulses in a binary model for simulating an interference environment.

For example, either the binary model mentioned at the beginning or the frequency model may be chosen for implementing the interference scenario. This depends on the performance of the logic modules used. In the case of the binary model, interference pulses occurring in a vehicle electrical system—as shown in FIG. 2—are described by their maximum amplitude A, their duration B and their interval D as square waves. This allows for a relatively simple implementation using programmable logic modules, which may be in a frequency range blow 50 MHz.

Figure 3:
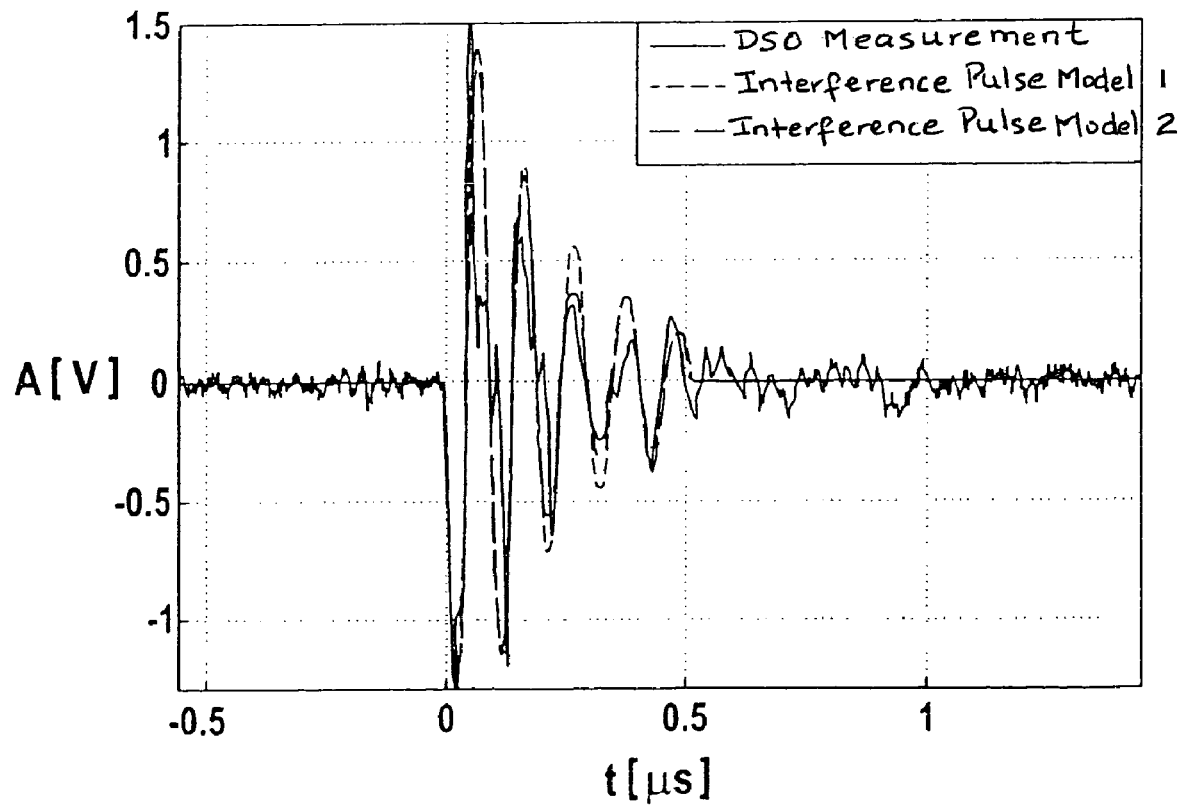
FIG. 3 shows the representation of interference pulses in a frequency model for simulating an interference environment.

In the case of the frequency model, the aim is to represent interference pulses occurring in a vehicle electrical system in their precise patterns, as shown in FIG. 3. The characteristic of the pulse is also preserved in the time-frequency plane, allowing for conclusions across the entire frequency range. Using the frequency model, the interference pulse may be simulated in various ways; conceivable options being, for example, an STFT (short-time Fourier transformation) estimation, a TFAR (time-frequency auto-regressive) estimation or a WVD (Wigner-Ville distribution) estimation. The voltage curve "DSO measurement" shown in FIG. 3 is the curve of the interference pulses measured using a digital storage oscilloscope. The curve "Interference pulse model 1" was ascertained in an interference pulse modeling using a least-square estimator, while the curve "Interference pulse model 2" was ascertained using a polynomial interpolation. The use of other interference pulse models is of course conceivable. More detailed information regarding the use of a frequency model for simulating a concrete interference environment can also be found in the German patent application document no. 103 01 525.

Using a demodulator 18, modulated output signal 11 is converted into a base output signal 19 which is transmitted to a participant 20 who can be connected to the simulated network. Participant 20 is either an actually existing participant who is physically connected to simulation device 2 or a simulated participant (for example in the form of a receiving device or a transceiver) who receives base output signal 11. In place of demodulator 18 and participant 20, a receiving device (or a transceiver) may also be provided for receiving modulated output signal 11.

In the exemplary embodiment shown in FIG. 1, the signal transmitted via the simulated network, i.e. that part of modulated input signal 4 that still arrives at participant 20 following the transmission via the network, is issued as output signal 11. The quality of the data transmission via the network may be ascertained from output signal 11 or 19 and from input signal 4 or 14 by quotient formation for example. Instead of the signal received by participant 20, however, a quantity characteristic of the quality of the transmission may be issued directly. Such a quantity, for example, is the bit error rate (BER).

The channel characteristic of the network must be known and mathematically describable, so that it can be simulated by parameters 8. The characteristics of conventional networks, but also those of conditioned networks, may be measured and described. In the case of conditioned networks, special— which may be mathematically readily describable—characteristics of the network are generated by special measures such as, for example, twisted double lines, ferrite beads etc. The captured channel characteristic of these networks can then be simulated using parameter records which are stored in the programmable logic module or in memory element 9.

If transmission/receiving devices (so-called transceivers) are provided on the input side (inputs 3, 5, 7) of device 2 as well as on the output side (output 12), then a data transmission between simulated participants 15 and 20 via the network can be simulated in arbitrary directions. In this case, both modulator 13 as well as demodulator 18 would have to take the form of a modulator/demodulator (modem).

In the exemplary embodiment shown in FIG. 1, only two participants 15, 20 are connected to the simulation device. It is conceivable, of course, to connect more than two participants to device 2 and to simulate the data transmission between these participants.

Figure 4:
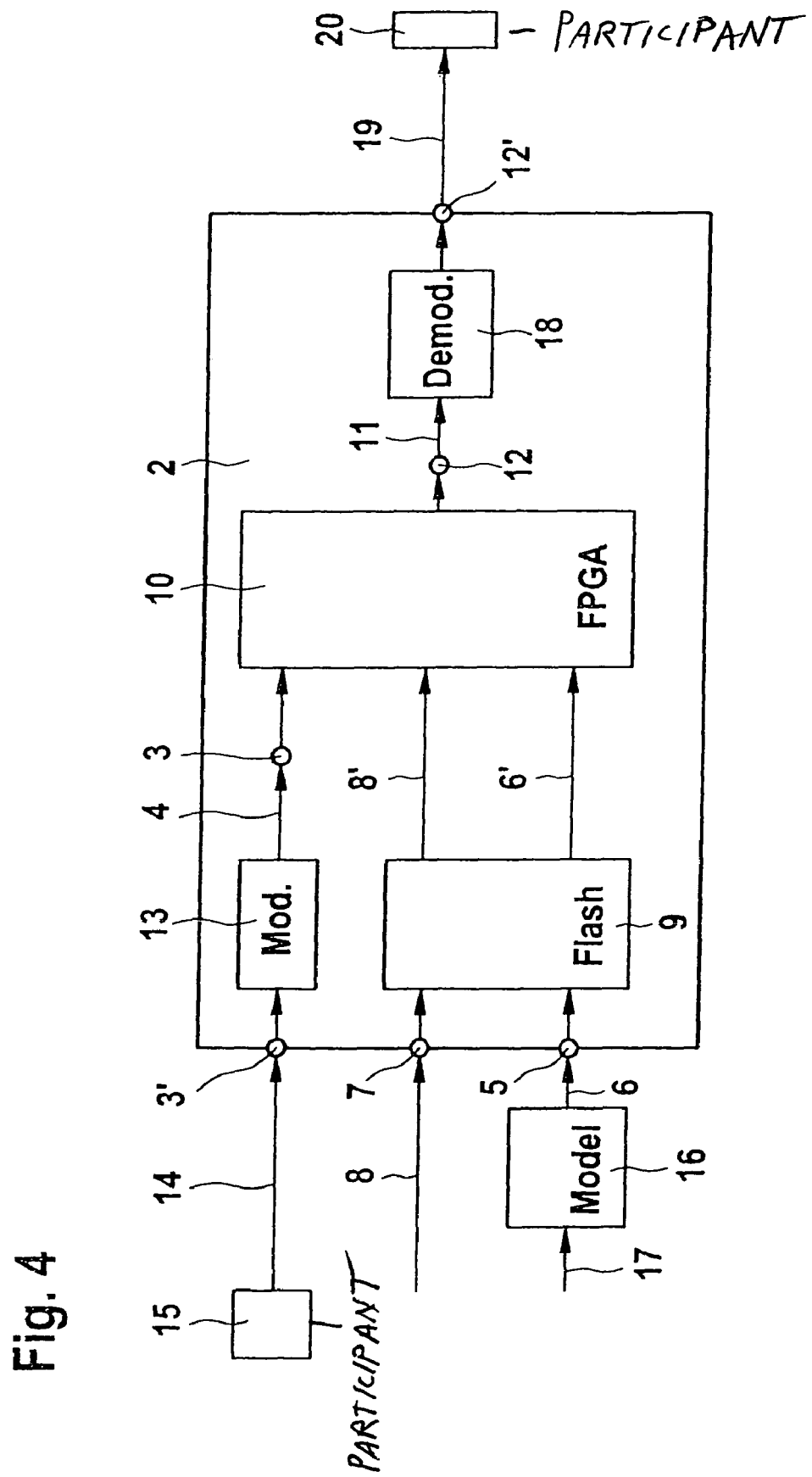
FIG. 4 shows a schematic representation of the principal structure of a simulation device of the present invention according to a second exemplary embodiment.

FIG. 4 shows a second exemplary embodiment of simulation device 2. In contrast to the first exemplary embodiment, in the second exemplary embodiment, modulator 13 is contained in simulation device 2, so that base signal 14 is available at input 3. Accordingly, demodulator 18 is also contained in device 2, so that base output signal 19 is available at output 12. For the implementation of modulator 13 and of demodulator 18, parameters of a model of modulator 13 or of demodulator 18 may be stored, for example, in a VHDL (VHSIC (very high speed integrated circuit) hardware description language) code on a logic module. The logic module for implementing modulator 13 or demodulator 18 may be FPGA 10 or another logic module of device 2.

Figure 5:
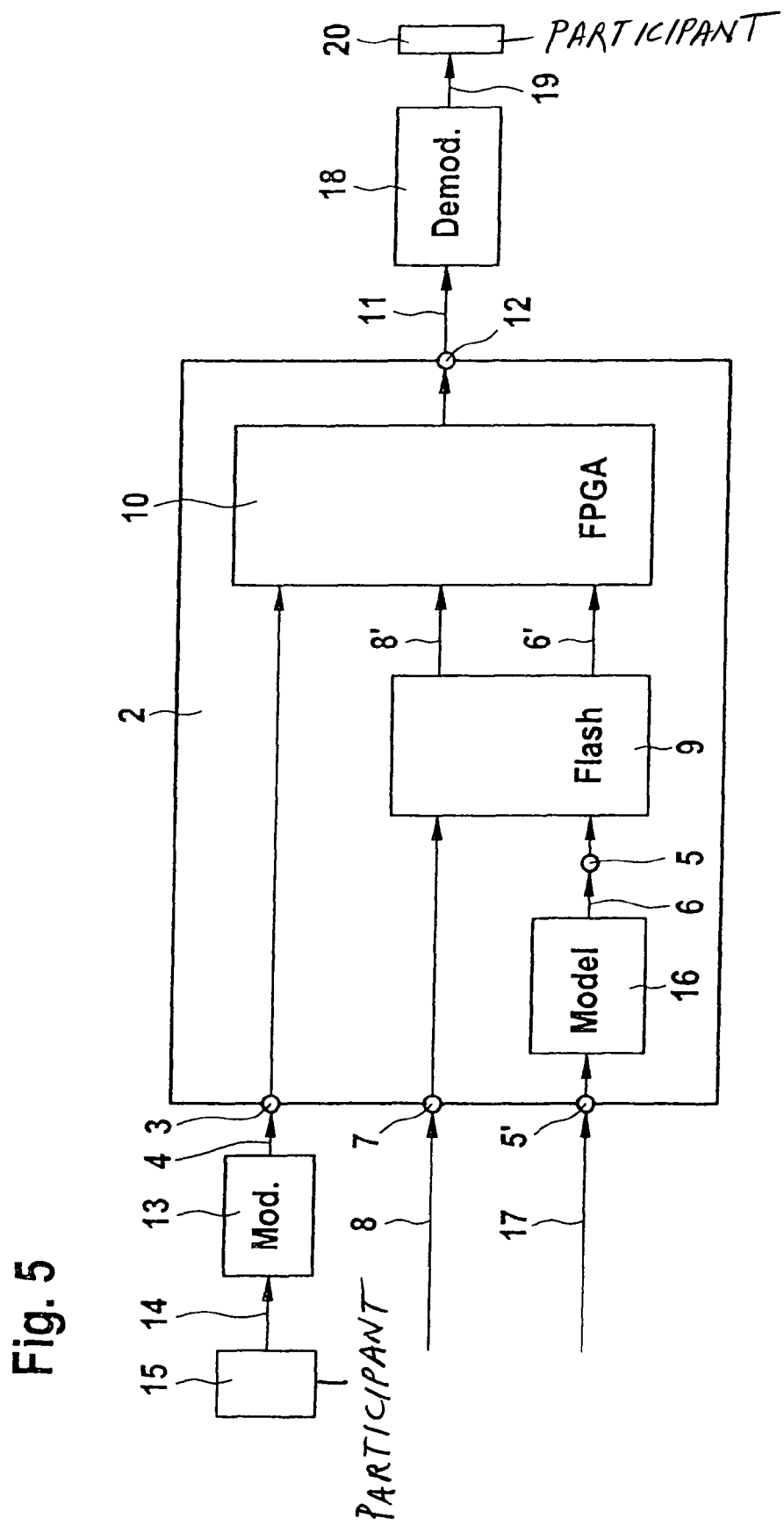
FIG. 5 shows a schematic representation of the principal structure of a simulation device of the present invention according to a third exemplary embodiment.

FIG. 5 shows a third exemplary embodiment of simulation device 2. In contrast to the first exemplary embodiment, in the third exemplary embodiment, model 16 for generating description 6 of the interference environment is contained in simulation device 2, so that measured interference pulses 17 can be applied directly at input 5. For the implementation of model 16, parameters of model 16 may be stored, for example, in a VHDL (VHSIC (very high speed integrated circuit) hardware description language) code on a logic module. The logic module for implementing model 16 may be FPGA 10 or another logic module of device 2.

Figure 6:
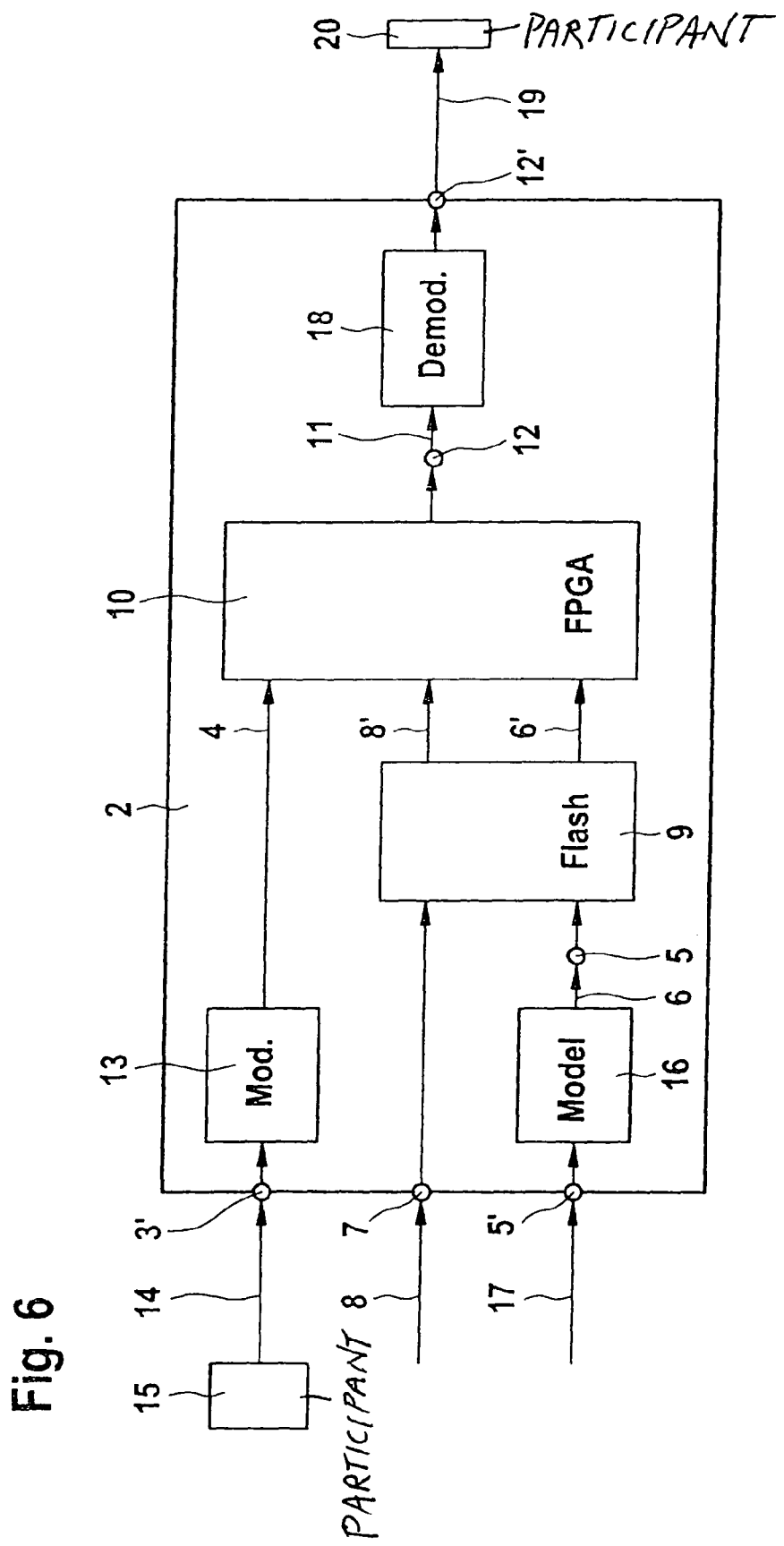
FIG. 6 shows a schematic representation of the principal structure of a simulation device of the present invention according to a fourth exemplary embodiment.

FIG. 6 shows a fourth exemplary embodiment of simulation device 2. In contrast to the second exemplary embodiment, in the fourth exemplary embodiment, model 16 for generating description 6 of the interference environment is contained in simulation device 2, so that measured interference pulses 17 can be applied directly at input 5. For the implementation of model 16, parameters of model 16 may be stored, for example, in a VHDL (VHSIC (very high speed integrated circuit) hardware description language) code on a logic module. The logic module for implementing model 16 may be FPGA 10 or another logic module of device 2.

What is claimed is:

1. A device to simulate a data transmission via a vehicle data transmission network in a motor vehicle, to evaluate the transmission quality via the network as a function of an interference environment and of a channel characteristic of the network, the device comprising:
   a first arrangement to receive at least one modulated input signal to be transmitted by wire via the network of the motor vehicle;
   a second arrangement to receive a description of a simulated interference environment;
   a third arrangement to receive a description of a simulated channel characteristic of the network of the motor vehicle;
   a fourth arrangement to determine an output signal according to a specifiable algorithm as a function of the received signal and taking into consideration the description of the interference environment and the description of the channel characteristic, the output signal allowing for a conclusion regarding the quality of transmission via the network in the motor vehicle, the fourth arrangement including at least one logic module on which the algorithm is programmed;
   a baseband signal receiving arrangement to receive a baseband signal; and
   a modulator to convert the baseband signal into the at least one modulated input signal;
   wherein a power line communications-network is simulated,
   wherein the device tests new components in the transmission network,
   wherein the output signal is a bit error rate signal between the input signal and the input signal transmitted via the network under the given conditions of the interference environment and of the channel characteristic,
   wherein the modulator or the demodulator is implemented as a logic module on which parameters of a model of the modulator or of the demodulator are stored,
   wherein each logic module includes a field programmable gate array (FPGA) or a digital signal processor (DSP), and
   wherein parameters of a model of the modulator or of the demodulator are stored.

2. The device of claim 1, further comprising:
   a memory arrangement, the memory arrangement including at least one of a memory element and a flash memory, to store the description of the simulated interference environment as a parameter record.

3. The device of claim 1, wherein various standard interference scenarios, which simulate various operating states of the motor vehicle, are stored in the memory arrangement and are selectable to set a specific interference environment to perform the simulation of the data transmission.

4. The device of claim 1, further comprising:
   an interference signal receiving arrangement to receive measured interference signals and a simulating arrangement to simulate the interference environment and to generate the description of the simulated interference environment.

5. The device of claim 1, further comprising:
   a memory arrangement, the memory arrangement including at least one of a memory element and a flash memory, to store the simulated channel characteristic as a parameter record.

6. The device of claim 1, wherein the output signal is the input signal transmitted via the network under the given conditions of the interference environment and the channel characteristic.

7. The device of claim 6, further comprising:
   an output arrangement to output a baseband signal; and
   a demodulator to convert the modulated output signal into the baseband signal.

8. The device of claim 1, wherein the parameters of the model of the modulator or of the demodulator are stored using hardware description language code (VHDL) in a very high speed integrated circuit (VHSIC).

9. The device of claim 1, wherein the simulation is of a power line communications environment.

10. The device of claim 1, wherein the simulation is performed in a lab environment.

11. The device of claim 1, wherein the description of a simulated interference environment may be chosen from a binary model or frequency model.

12. The device of claim 11, wherein in the case of the binary model, interference pulses occurring in an electrical system of the vehicle are characterized solely by maximum amplitude, duration, and interval.

13. The device of claim 1, wherein the channel characteristic is modeled by connecting multiple filter structures in series, wherein the multiple filter structures are implemented in an FPGA.

14. A method to simulate a data transmission via a vehicle data transmission network in a motor vehicle, to evaluate the transmission quality via the network as a function of an interference environment and of a channel characteristic of the network, the method comprising:
   receiving at least one modulated input signal to be transmitted by wire via the network of the motor vehicle;
   receiving a description of a simulated interference environment;
   receiving a description of a simulated channel characteristic of the network of the motor vehicle;
   determining a modulated output signal according to a specifiable algorithm as a function of the received signal and taking into consideration the description of the interference environment and the description of the channel characteristic, the output signal allowing for a conclusion regarding the quality of transmission via the network in the motor vehicle, the algorithm being programmed on at least one logic module;
   receiving a baseband signal with a baseband signal receiving arrangement; and
   converting, with a modulator, the baseband signal into the at least one modulated input signal;
   wherein a power line communications-network is simulated,
   wherein new components are tested in the transmission network
   wherein the output signal is a bit error rate signal between the input signal and the input signal transmitted via the network under the given conditions of the interference environment and of the channel characteristic,
   wherein the modulator or the demodulator is implemented as a logic module on which parameters of a model of the modulator or of the demodulator are stored, wherein each logic module includes a field programmable gate array (FPGA) or a digital signal processor (DSP), and wherein parameters of a model of the modulator or of the demodulator are stored.

15. A non-tansitory computer-readable medium having a computer program that is executable on a processor arrangement, comprising:

computer program code to perform, when executed, a process to simulate a data transmission via a data transmission network in a motor vehicle, to evaluate the transmission quality via the network as a function of an interference environment and of a channel characteristic of the network, by performing the following:

receiving at least one modulated input signal to be transmitted via the network of the motor vehicle;

receiving a description of a simulated interference environment;

receiving a description of a simulated channel characteristic of the network of the motor vehicle; and determining a modulated output signal according to a specifiable algorithm as a function of the received signal and taking into consideration the description of the interference environment and the description of the channel characteristic, the output signal allowing for a conclusion regarding the quality of transmission via the network in the motor vehicle, the algorithm being programmed on at least one logic module;

receiving a baseband signal with a baseband signal receiving arrangement; and converting, with a modulator, the baseband signal into the at least one modulated input signal;

wherein a power line communications-network is simulated, wherein new components are tested in the transmission network wherein the output signal is a bit error rate signal between the input signal and the input signal transmitted via the network under the given conditions of the interference environment and of the channel characteristic, wherein the modulator or the demodulator is implemented as a logic module on which parameters of a model of the modulator or of the demodulator are stored, wherein each logic module includes a field programmable gate array (FPGA) or a digital signal processor (DSP), and wherein parameters of a model of the modulator or of the demodulator are stored.

16. The non-transitory computer-readable medium of claim 15, wherein the at least one logic module includes a programmable logic module or programmed logic module.

17. The non-transitory computer-readable medium of claim 15, wherein the simulation is of a power line communications environment.

* * * * *